May 24, 1932. A. HOWARD 1,860,182
TRANSMISSION OF POWER
Filed March 20, 1930
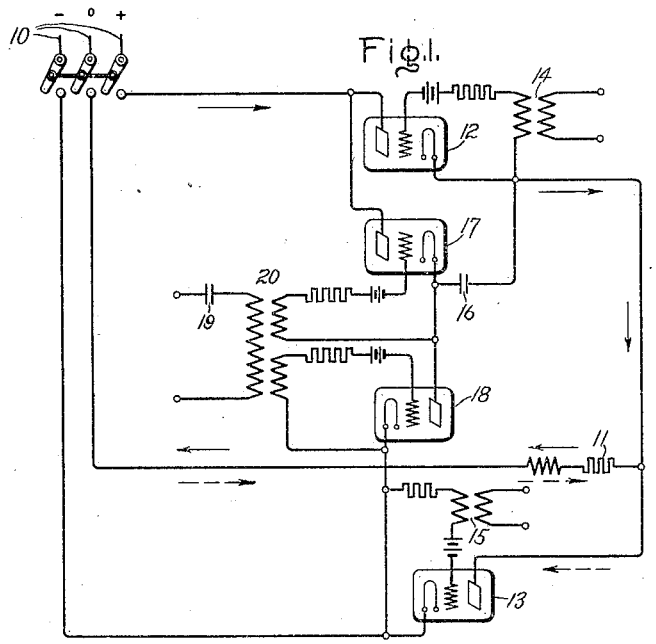
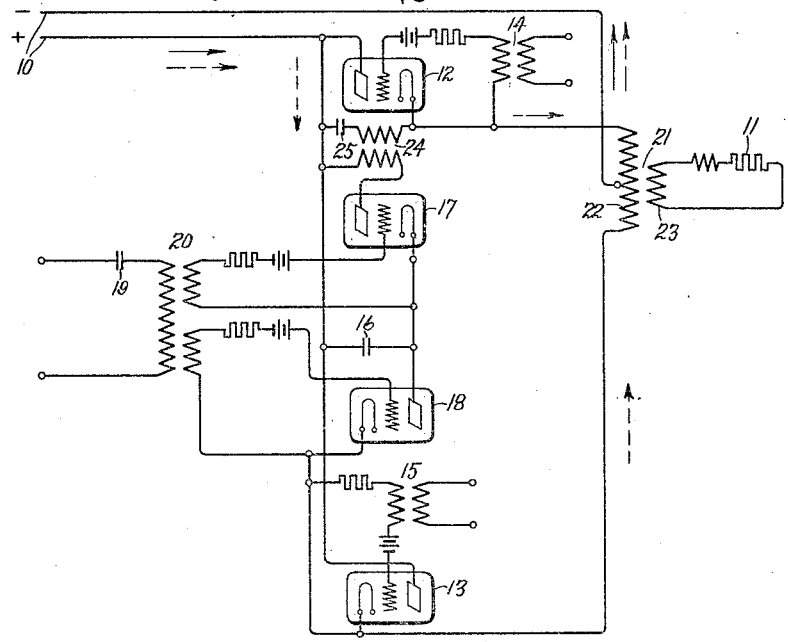
Inventor:
Alan Howard,
by Charles E. Mullan
His Attorney.

Patented May 24, 1932

1,860,182

UNITED STATES PATENT OFFICE

ALAN HOWARD, OF SCHENECTADY, NEW YORK, ASSIGNOR TO GENERAL ELECTRIC COMPANY, A CORPORATION OF NEW YORK

TRANSMISSION OF POWER

Application filed March 20, 1930. Serial No. 437,625.

My invention relates to the transmission of electric power between direct and alternating current circuits, and has for its principal object the provision of an improved apparatus and method of operation for effecting the transfer of power between such circuits.

It is well known that power may be transmitted between direct and alternating current circuits through apparatus including a plurality of electric discharge devices arranged to vary the path of current flow through the apparatus. Where the discharge devices are of the type in which the conduction of current is effected by means of both electrons and positive ions, a control electrode or grid is capable of preventing the starting of current through the device but is incapable of stopping it after it has started. In the operation of such apparatus grid control of the current between the anode and cathode is regained only when the plate or anode potential is reduced substantially to zero. Thus if alternating potential is applied between the cathode and anode, grid control is secured at the end of each half cycle. Where a unidirectional potential is applied between the anode and cathode some means must be provided for neutralizing the effect of this potential if control of the current by the grid is to be secured. In accordance with my invention, this result is produced by an improved arrangement wherein a counter or neutralizing voltage is temporarily applied between the cathode and the anode for the purpose of restoring control to the grid.

My invention will be better understood from the following description when considered in connection with the accompanying drawings and the claims appended hereto.

Referring to the drawings, Fig. 1 illustrates the application of my invention to an apparatus suitable for transferring power between a three wire direct current circuit and an alternating current circuit; and Fig. 2 illustrates a similar apparatus adapted to effect the transfer of power between a two wire direct current circuit and an alternating current circuit.

The apparatus illustrated by Fig. 1 includes a three-wire direct current circuit 10 and an alternating current circuit 11, which are interconnected through means including a pair of electric discharge devices 12 and 13. The device 12 is provided with an input or grid control circuit arranged to be energized through a transformer 14 and the device 13 is provided with a like circuit arrangement to be energized through a transformer 15. While the input circuits of the devices 12 and 13 have been illustrated as energized through separate transformers, it will be evident that they may be energized from different windings of the same transformer. Whether they are energized from the same transformer or different transformers it is desirable that they be subjected to voltages which are substantially 180 electrical degrees out of phase with one another. Under these conditions, the grid polarity of the device 12 is positive when that of the device 13 is negative and vice versa.

In general, it may be assumed that the devices 12 and 13 transmit current when their grid polarity is positive and do not transmit current when their grid potential is negative. Although the application of a positive potential to the grid circuit of a vapor electric device permits the starting of current through it, the application of negative potential to the grid does not cause interruption of this current. It is therefore necessary for satisfactory operation of such devices to provide some means for interrupting this current in order that the negatively charged grid may be capable of preventing the restarting of the current until desired.

This result is effected by energy storage means such as a capacitor 16 which is arranged to be connected through an electrical discharge device 17 to the anode circuit of the device 12 and through an electrical discharge device 18 to the anode circuit of the device 13. Control potential is applied to the grid circuits of the devices 17 and 18 through a capacitor 19 and a transformer 20.

With this arrangement, the grid potentials of the devices 17 and 18 are 180 electrical degrees out of phase. Due to the capacitor 19 the grid of the device 18 becomes positive slightly before the grid of the device 12 and the grid of the device 17 becomes positive slightly before the grid of device 13. If desired, the grid circuits of all the devices 12, 13, 17 and 18 may be controlled from the same source of alternating potential.

In explaining the operation of the apparatus, it will be assumed that the direct current circuit 10 is connected to the apparatus and that the polarity of the control potentials are such that current may be supplied to the capacitor 16 through the device 18. An instant later the grid polarity of the device 12 permits the starting currents through it and current is supplied for one-half cycle to the alternating current circuit, as indicated by the full line arrows.

At the beginning of this half cycle, the capacitor 16 is charged by current supplied through the devices 12 and 18. This charging current has died down nearly to zero before the end of the half cycle and near the end of the half cycle the grid potentials of the devices 12 and 18 become negative. Immediately thereafter the grid potentials of the devices 17 and 13 become positive.

The effect of applying a positive grid potential to the device 17 is to connect the capacitor between the anode and cathode of the device 12 and apply it to the plate or anode circuit of this device a counter or neutralizing voltage whereby the current of this device is interrupted temporarily and control is restored to its negatively charged grid.

At about the same time, the grid potential of the device 13 becomes positive and, during the next successive half cycle, current is transmitted. This current is indicated by the broken line arrows. At the beginning of the half cycle but after interruption of the current of the device 12, the capacitor 16 is charged by current supplied through the devices 17 and 13. Near the end of the half cycle, the grid polarity of the device 17 becomes negative and that of the device 18 becomes positive, thus interrupting the connection of the capacitor 16 to the anode circuit of the device 12 and connecting it across the anode circuit of the device 13. At about the same time, the grid potential of the device 13 becomes negative and the current of this device is interrupted due to the neutralizing voltage applied to it by the capacitor 16. Operation of the apparatus during the following successive half cycles involve merely a repetition of the various steps set forth above.

It has been found that apparatus of Fig. 1 has the advantage that it does not need to be tuned to the frequency of the excitation potential applied through the transformers 14, 15 and 20, maintains nearly constant wave shape over a large range of frequencies and avoids the transmission of the load current through condensers or other impedances. Due to the absence of impedance devices in the path of load current, voltage regulation of the apparatus is better than heretofore realized in the operation of many apparatus of this type.

The arrangement of Fig. 2 operates on the same principle as that of Fig. 1. It includes a transformer 21, having a winding 22, which is provided with end terminals arranged to be connected to the positive direct current lead 10 successively through the devices 12 and 13 and with an intermediate terminal connected to the negative direct current lead 10. The transformer 21 also includes a winding 23 which is connected to the alternating current circuit 11.

The operation of the arrangement of Fig. 2 is similar to that of Fig. 1. Beginning at the instant when the grid potential of the device 12 becomes positive, load current is transmitted through the apparatus, as indicated by the full line arrows. Just before the beginning of the half cycle during which current flows through the device 12, the grid potential of the device 18 becomes positive and, during this half cycle, the capacitor 16 is charged by current supplied through the device 18. Near the end of this half cycle, the grid polarity of the device 18 becomes negative and that of the device 17 becomes positive, thus permitting the capacitor 16 to discharge through a transformer 24 and a capacitor 25, and interrupting the current of the device 12.

At about the same time the grid potential of the device 13 becomes positive and, during the next successive half cycle, load current is transmitted through the apparatus as indicated by the broken line arrows. During this half cycle, the capacitor 16 is charged by current induced in the anode circuit of the device 17 by the transformer 24. Near the end of this half cycle, the grid polarity of the device 17 becomes negative and that of the device 18 becomes positive, thus connecting the capacitor 16 between the cathode and anode of the device 13 and interrupting the current of this device long enough for its negatively charged grid to gain control. The further operation of the apparatus will be readily understood in view of the foregoing explanation. As will be apparent to those skilled in the art, the capacitor 25 is provided for the purpose of excluding direct current from the transformer winding connected between the cathode and anode of the device 12.

What I claim as new and desire to secure by Letters Patent of the United States is:

1. The combination of a plurality of current paths each including a vapor electric discharge device provided with a grid for controlling the starting of current between its cathode and anode, means for applying a holding potential successively to the grids of said devices, a capacitor, and electric discharge means arranged to connect said capacitor across the anode-cathode circuits of said devices successively for producing a neutralizing potential whereby current therein is interrupted.

2. The combination of a circuit including a vapor electric discharge device provided with a grid for controlling the starting of current through said circuit, a capacitor, electric discharge means arranged to complete a connection through which charging current is supplied to said capacitor and electric discharge means arranged to connect said capacitor across said device for subjecting it to a neutralizing voltage whereby the current of said circuit is interrupted.

3. The combination of a circuit includging a vapor electric discharge device provided with a grid for controlling the starting of current through said circuit, a capacitor, electric discharge means arranged to complete a connection through which charging current is supplied to said capacitor, electric discharge means arranged to connect said capacitor across said device for subjecting it to a neutralizing voltage whereby the current of said circuit is interrupted, and means for applying a holding potential to said grid.

4. The combination of an alternating current circuit, a pair of vapor electric discharge paths arranged to transmit current to said circuit in different directions, grid control means for successively rendering said discharge paths alternately conductive and nonconductive, a capacitor, and electric discharge means arranged to transmit charging current to said capacitor and to connect it across said devices for applying thereto a neutralizing potential whereby the currents of said paths are successively interrupted.

5. The combination of an alternating current circuit, a pair of vapor electric discharge paths arranged to transmit current to said circuit in different directions, grid control means for successively rendering said discharge paths alternately conductive and nonconductive, a capacitor, electric discharge means arranged to transmit charging current to said capacitor and to connect it across said devices for applying thereto a neutralizing potential whereby the currents of said paths are successively interrupted, and a direct current circuit for supplying current to said devices and said capacitor.

6. In combination, a direct current supply circuit, an alternating current load circuit, apparatus for transmitting energy therebetween comprising a plurality of current paths each including a vapor electric discharge device provided with a control grid for controlling the starting of current between its cathode and anode, means for exciting said control grids to successively render said valves alternately conductive and nonconductive, a capacitor associated with said discharge devices, and electric discharge means for controlling the charging and discharging of said capacitor for successively applying a neutralizing potential to the anode-cathode circuits of said devices for interrupting the current therein.

In witness thereof, I hereunto set my hand this 17th day of March, 1930.

ALAN HOWARD.